W. L. CHAMBERLAIN.
INSULATOR SUPPORT.
APPLICATION FILED JUNE 5, 1908.
989,231.
Patented Apr. 11, 1911.
2 SHEETS—SHEET 1.
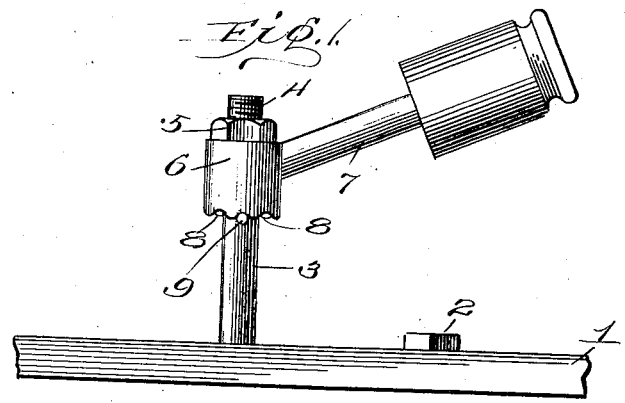
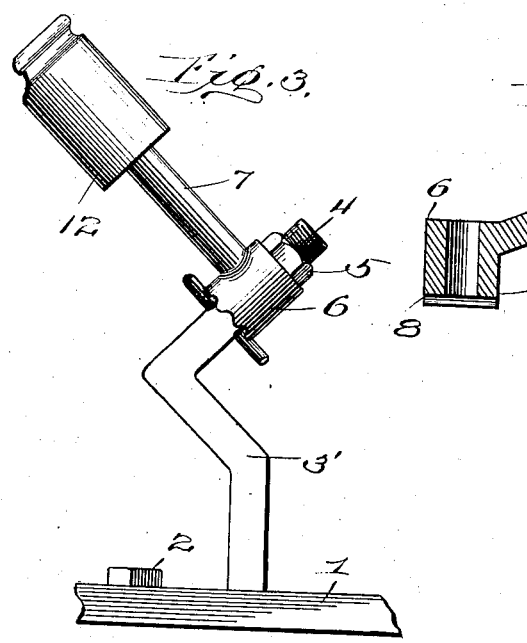
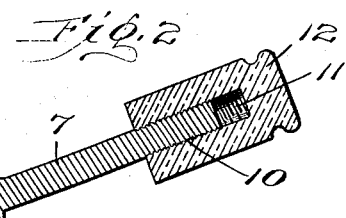
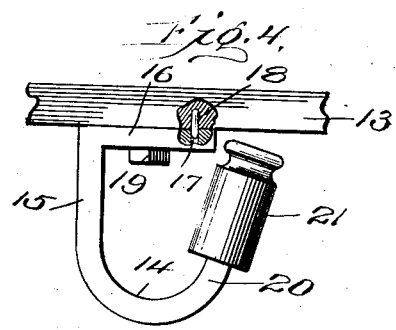
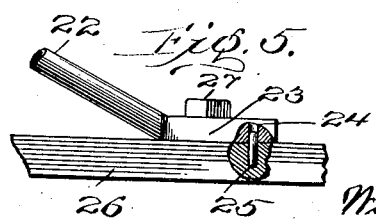
Witnesses
Inventor
Wilbur L. Chamberlain W. L. CHAMBERLAIN.
INSULATOR SUPPORT.
APPLICATION FILED JUNE 5, 1908.
989,231.
Patented Apr. 11, 1911.
2 SHEETS—SHEET 2.
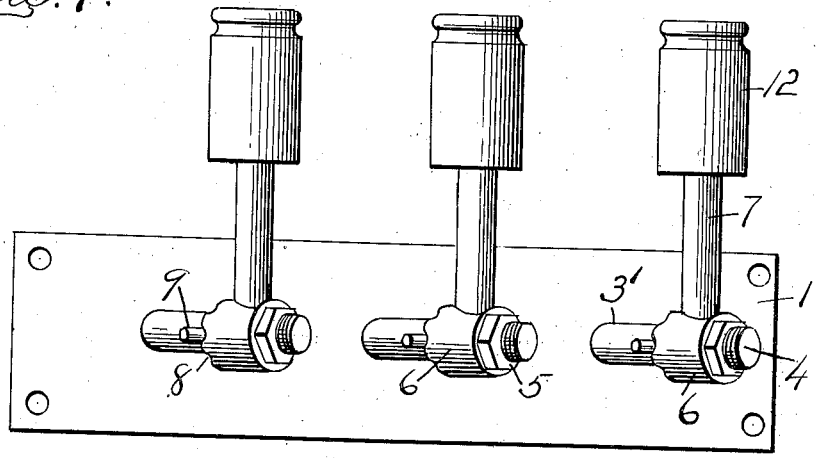
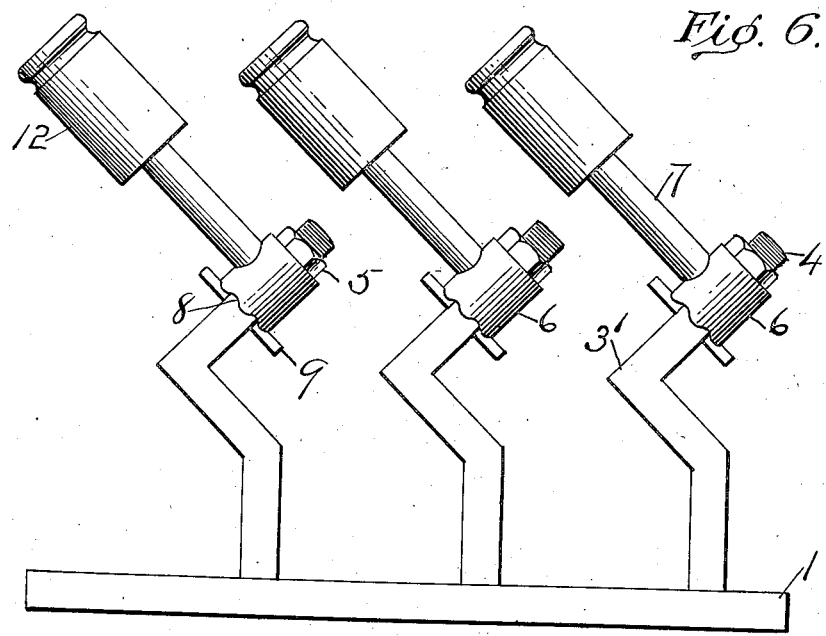
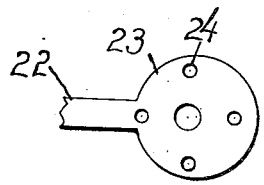
WITNESSES:
Mary F. Stevens
D. L. Frissendall
INVENTOR.
BY Wilbur L. Chamberlain
Arthur B. Jenkins,
ATTORNEY.

UNITED STATES PATENT OFFICE.

WILBUR L. CHAMBERLAIN, OF EAST HARTFORD, CONNECTICUT.

INSULATOR-SUPPORT.

989,231.

Specification of Letters Patent. Patented Apr. 11, 1911.

Application filed June 5, 1908. Serial No. 436,790.

*To all whom it may concern:*

Be it known that I, WILBUR L. CHAMBERLAIN, a citizen of the United States, residing at 4 Elm street, East Hartford, county of Hartford, State of Connecticut, have invented certain new and useful Improvements in Insulator-Supports, of which the following is a specification.

This invention relates to new and useful improvements in insulator supports and it is primarily an object of the invention to provide a novel device of this character wherein the insulators are so held as to be adjustable to various angles in a plane parallel with their supporting base or plate. The angle is such that they overlap when adjusted in the direction of the plate to save room.

It is also an object of the invention to provide a novel device of this character including a base or plate having rotatably mounted thereon supports for insulators, said supports being provided with means acting in conjunction with the base or plate for holding the supports in different angles in a plane parallel with said base or plate as the necessities of practice may require.

The invention also has for an object to produce a novel device of this character which, when applied to a building, may have its support so adjusted as to bring the insulator with its axis approximately in a vertical position.

Furthermore, it is an object of the invention to provide a novel device of this character which will be simple in construction, efficient and advantageous in practice and comparatively inexpensive to manufacture.

With the above and other objects in view the invention consists of the details of construction and in the novel arrangement and combination of parts to be hereinafter more particularly referred to.

In describing the invention in detail reference will be had to the accompanying drawings forming part of this specification, wherein like characters of reference denote corresponding parts in the several views and in which—

Figure 1, is a fragmentary view in side elevation, illustrating the invention; Fig. 2, a detail sectional view of the support proper employed in the invention; Fig. 3, is a view similar to Fig. 1, illustrating a slightly modified form of invention; Fig. 4, is a fragmentary view partly in elevation and partly in section illustrating a further modified form of invention; and Fig. 5, is a view similar to Fig. 4, illustrating a still further modified form of invention. Fig. 6 is a view in elevation showing a number of the devices relatively arranged and with the insulators overlapping the supports of other insulators. Fig. 7 is a plan view of the device shown in Fig. 6 showing the insulators swung to one side. Fig. 8 is a detail view showing the arrangement of holes in the extension from the shank by means of which different adjustments may be secured.

In the drawings 1 denotes a base or plate of any desired size, shape and material adapted to be secured to the wall of a building or other anchoring place by the screws 2, as is thought to be obvious. Projecting outwardly from one of the surfaces of the base 1, at right angles thereto is a shank or post 3, having its free end portion 4, screw threaded to be engaged by the clamping or retaining nut 5.

The recent expensive introduction of a three-wire system for electric lighting purposes makes it necessary to fasten three insulators on a house, and as the lineman is unable to tell without an examination of the premises in what position these insulators will have to be placed it is of great importance that he shall bring a mounted plate having three insulators thereon which are adjustable to whatever position may be required. To meet such an emergency I have constructed the within improved insulator support, its methods of use being especially illustrated in Figs. 6 and 7.

Surrounding the shank 3, is a collar 6, formed at the end of a stem 7, the axis of the bore of the collar 6, being located at an angle to the axis of the stem. The under edge surface of the collar 6, is provided with a plurality of radial channels or grooves 8. These channels are adapted to receive or straddle a cross pin 9, extending through the shank 3, and projecting therefrom at opposed sides and at right angles thereto. By this arrangement it is thought to be obvious that the collar 6, may be so turned about the shank 3, as to bring the stem 7. into the desired position with relation to the base 1, and thus properly position the insulator, when the plate 1, is applied to a building or other support. After the stem 7, has been properly adjusted with relation to the plate 1, or more properly speaking the shank 3, it is held in such position by the clamping or retaining nut 4, which is caused to bear against the upper surface of the collar 6, and hold the cross pin 9, in certain of the alining channels or grooves 8.

The free or outer end portion of the stem 7, is screw threaded, as at 10, for engagement with the threaded recess 11, of the insulator block 12 as is clearly apparent in the drawings.

In Fig. 3, of the drawings is shown a device similar in every way to that illustrated in Figs. 1 and 2 with the exception that the shank 3', thereof is angularly disposed, said arrangement being such as is often required in the practical application of the device.

Fig. 4, of the drawings illustrates a form of invention intended to be employed with a roof or covering of a building or with a support horizontally disposed. In this form the plate or base 13, has secured thereto the approximately U-shaped shank 14, one stem thereof being slightly inclined outwardly with relation to the second stem. Formed with the free end of the straight stem 15, of the shank 14, and extending inwardly therefrom at right angle thereto is an arm 16, having, adjacent its free end, an opening 17, into which is adapted to be extended a pin 18, anchored in the plate or base 13, to hold the arm 16, or the shank 14, against rotary movement around its retaining bolt 19. This bolt 19, also serves as a retaining means for the plate or base 13. The free end portion of the inclined stem 20, of the shank 14, is intended to be engaged by an insulator block 21.

The form of invention shown in Fig. 5, of the drawings is intended to be used in a manner similar to the form disclosed in Figs. 1 and 3 and differs only in that it is held in its various positions by a retaining means similar to that employed in Fig. 4. In this structure, the shank 22, terminates in an angular extension 23, at one end provided with an opening 24 into which extends a pin 25 held by the base or plate 26. This extension 23, is rotatably held to the base or plate 26, by a screw 27, which also serves as a securing means for the base or plate 26. It is also thought well to mention that the arm 16, and the extension 23, are enlarged laterally and that there are a plurality of openings therein arranged in circular form around their pivotal connections, said connections being centrally of the circles so formed, as shown in Fig. 8 of the drawings.

I claim:—

1. In an insulator support a base, a plurality of posts projecting from the base, a stem projecting from each post, means for adjusting the stem in different positions about the axis of the post, an insulator secured at the end of each stem, the length of the stem and insulator being greater than the distance between the posts, and the axis of each stem being so inclined that its outer end is located at a greater distance from the base than its inner end whereby the insulators may be swung over the ends of the other posts.

2. In an insulator support a base, a plurality of posts projecting from the base, the axis of each being parallel with another, a stem projecting at an angle from the axis of each post, means for moving the stem to different positions about the axis of the post, each stem projecting at such angle from the post that its outer end is farther from the base than the inner end, and an insulator secured to the outer end of the post, the length of the stem and the insulator being greater than the distance between the posts.

3. In an insulator support a base, a plurality of posts projecting from the base and arranged in line thereon, a stem projecting at an angle from each post, means for moving each stem to different positions about the axis of its post, said stem projecting at such angle that its outer end is farther from the base than its inner end, an insulator secured to the outer end of each stem, the length of the stem and insulator being greater than the distance between the posts, and means for locking each stem against movement of the post.

4. In an insulator support a base, a plurality of posts projecting from the base, a collar rotatably mounted on each post, means for locking the collar against rotation, a stem projecting from each collar at such angle that its outer end is located farther from the base than its inner end, and an insulator secured to each stem, the length of the insulators and stems being greater than the distance between the posts.

WILBUR L. CHAMBERLAIN.

Witnesses:
ARTHUR B. JENKINS,
LENA E. BERKOVITCH.